United States Patent [19]
Richter

[11] Patent Number: 6,076,790
[45] Date of Patent: Jun. 20, 2000

[54] MOBILE ARTICLE SUPPORT DEVICE

[76] Inventor: Herbert Richter, Drosselweg 8, 75331 Engelbrand, Germany

[21] Appl. No.: 09/045,916

[22] Filed: Mar. 23, 1998

[30] Foreign Application Priority Data

Jan. 5, 1998 [GB] United Kingdom .............. 198 00 174

[51] Int. Cl.[7] ................................................ A47G 1/17
[52] U.S. Cl. ................................. 248/206.5; 248/309.4
[58] Field of Search ............................ 248/206.5, 309.4, 248/309.1, 687, 683

[56] References Cited

U.S. PATENT DOCUMENTS

| | | | |
|---|---|---|---|
| 1,890,000 | 12/1932 | Oakley ................................... | 248/687 |
| 2,580,099 | 12/1951 | Jaeger ..................................... | 335/285 |
| 2,693,788 | 11/1954 | Spatz ...................................... | 211/69.1 |
| 5,215,285 | 6/1993 | Lewis ...................................... | 248/457 |
| 5,221,006 | 6/1993 | Plumlee et al. ......................... | 206/350 |
| 5,405,004 | 4/1995 | Vest et al. ............................... | 206/350 |
| 5,760,668 | 6/1998 | Testa et al. ............................. | 335/285 |

*Primary Examiner*—Ramon O. Ramirez
*Assistant Examiner*—David Heisey
*Attorney, Agent, or Firm*—Klaus J. Bach

[57] ABSTRACT

In a support device for supporting mobile articles, particularly for supporting a mobile-telephone in a motor vehicle, which includes a support base having a support plate with a support surface, permanent magnets are embedded in the support surface for holding an article consisting at least partially of a magnetic material which is placed onto the support surface, in firm engagement with the support surface.

4 Claims, 1 Drawing Sheet

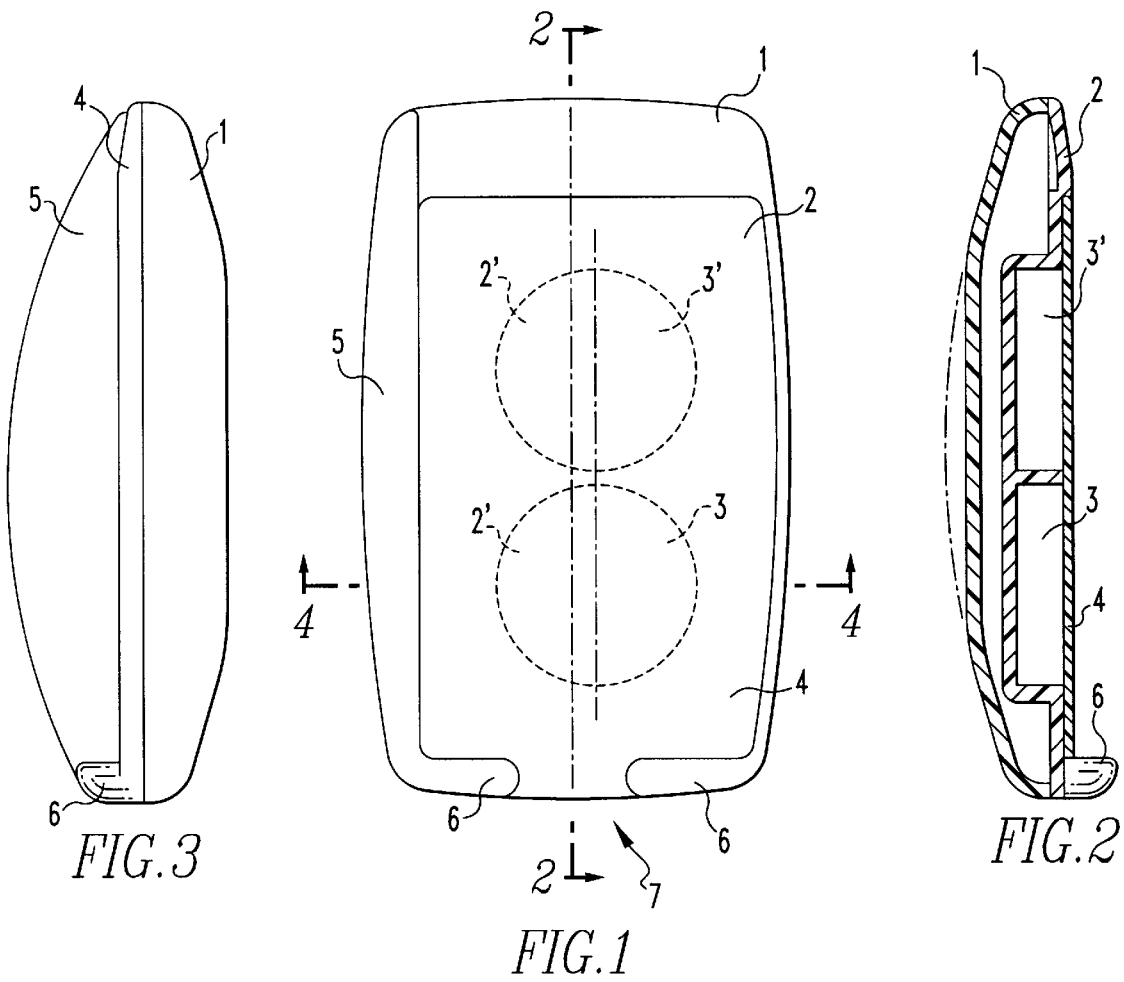

MOBILE ARTICLE SUPPORT DEVICE

BACKGROUND OF THE INVENTION

The invention relates to a mobile telephone support device which includes a base body to be mounted on a support surface for firmly retaining an article such as a mobile telephone.

With the increasing use of cellular telephones such support devices are becoming quite popular recently particularly for supporting cellular telephones in motor vehicles. Generally, such support devices include side walls which are pulled together by springs whereby an article or a telephone is engaged between the side walls. Also, support devices have become known which have side walls which can be moved toward each other against the force of a spring and which can be locked in various positions in which they engage an article or telephone therebetween. This arrangement has the advantage that the article can be released by unlocking the side walls so that they are moved apart by the spring and, in their rest positions, the side walls are disposed apart so that the article can be easily placed between the side walls of the support device and the side walls can then be moved together into engagement with the article and locked in place.

A support device, which operates particularly well, is disclosed in U.S. application Ser. No. 08/654,122. This support device includes a base body with two clamping walls which are movable relative to each other that is at least one of them is movable toward the other against the force of a spring and can be locked in various positions. A release mechanisms is provided by which the clamping walls can be released. It further includes a rotary member which is pivotally supported and is operatively coupled with the clamping wall so as to be rotated by lateral movement of the clamping wall. The locking mechanism includes a first engagement wedge by which the rotary member can be engaged. Although this support device operates effectively, it may not be suitable for all support applications, or it may be considered to be unnecessarily cumbersome by some users as the clamping walls have to be moved for depositing an article on, or removing it from, the support device.

It is therefore the principal object of the present invention to provide a support device for supporting articles and particularly mobile telephones in such a way that there is no need for the movement of engagement walls for retaining the article upon depositing the article nor for the removal of the article from the support device.

SUMMARY OF THE INVENTION

In a support device for supporting mobile articles, particularly for supporting a mobile-telephone in a motor vehicle, which includes a support base having a support plate with a support surface, permanent magnets are embedded in the support surface for holding an article consisting at least partially of a magnetic material which is placed onto the support surface, in firm engagement with the support surface.

The magnetic forces are sufficient to firmly hold the article in engagement with the bottom plate so that the article will not move unintentionally out of the support device but, on the other hand, the magnetic forces are sufficiently weak so that the article can be easily removed from the support device. Although only such articles are firmly held by the support device according to the invention which include a housing or housing portions of a ferromagnetic material most, articles which one wishes to support in such a way that they are readily available, such as mobile telephones, do include some portions of a ferromagnetic material.

Accordingly, such a limitation is not particularly restrictive.

Preferably, the magnet or magnets are permanent magnets. A cobalt nickel alloy permanent magnet was found to be particularly suitable. However, a ceramic magnet disposed in a steel containment is also quite suitable. These magnets provide a force which represents a good compromise between providing a firm hold for the article in the support device and a relatively easy removal of the article from the support device.

It is particularly advantageous if the support surface of the support device is provided with a non-skid surface cover. The non-skid surface cover retains the article more safely as the magnetic forces engage the article firmly with the non-skid surface so that the article remains firmly in position on the support device.

If the non-skid surface consists of an elastic material the article is still better retained on the support device: The magnetic forces cause the article to compress the elastic material so that the article is slightly embedded in the resilient surface layer whereby the article is snugly received in a depression generated by the magnetic forces. With the raised area extending around the article, displacement of the article on the support surface is practically impossible. It has been found to be particularly advantageous to use a sponge rubber as the non-skid surface layer on the support surface of the support device.

In another embodiment of the invention, a web structure extending normal to the support surface extends along one side of the support surface. The web structure forms a side wall of the support structure and provides for side support of an article placed onto the support surface so that the article can be properly placed onto the support surface without looking at the support device that is it can be placed onto the support surface simply by feel.

Placement of an article on the support device can be still more facilitated if the web structure extends along two adjacent side edges of the support surface of the support device. Such an arrangement provides for an angle or corner into which the article can be placed. With the angled side wall an article such as a mobile telephone can easily be placed properly onto the support surface of the support device without observing the process. This is particularly advantageous if the support device is used in a motor vehicle as the driver can place for example a mobile phone back onto the support surface without taking the eyes from the street traffic.

It is also possible to provide side walls at two opposite side edges. Such an arrangement is advantageous if one of the side walls is slideably adjustable so that the distance between the opposite side walls can be changed. However, since the holding force is generated by the magnets, the side walls do not need to apply clamping forces to an article placed between the side walls. The distance between the side walls may be so adjusted that an article can be placed on the support surface of the support device with some play. The side walls may be adjustable by a notch structure or by means of screws.

In another embodiment of the invention, the side wall formed by the webs is interrupted, that is, a recess is formed therein through which a connecting cable such as a power supply cord or an antenna cable may extend to a mobile phone disposed on the support device.

The support device preferably includes a mounting structure by way of which it can be mounted onto a support structure. Such a mounting structure may be, for example, a mounting bracket as shown in applicants US design patent D. 391,266 or Applicants U.S. patent (appl. Ser. No. 08/670, 459), which includes engagement claws adapted to be received in corresponding openings formed in the bottom wall of the support device. With such a mounting arrangement, the support device can be easily mounted on, and removed from, the mounting structure. However, the mounting structure may also consist simply of a double-sided self-adhesive pad disposed on the bottom wall of the support device.

The invention will be described in greater detail below on the basis of the accompanying drawings.

BRIEF DESCRIPTION

FIG. 1 is a top view of the support device according to the invention,

FIG. 2 is a cross-sectional view taken along line 2—2 of FIG. 1,

FIG. 3 is a plain side view of the device shown in FIG. 1 and,

FIG. 4 is a cross-sectional view taken along line 4—4 of FIG. 1.

DESCRIPTION OF A PREFERRED EMBODIMENT

As can be seen from the figures the support device comprises a base body 1 with a support plate 2 for supporting an article which is not shown. The bottom plate 2 includes two recesses 2' in which two cylindrical permanent magnets 3, 3' are firmly received. The upper surface of the permanent magnets 3, 3' is disposed in the same plane as the top side of the bottom plate 2. On the top of the support plate 2 and the magnets 3, 3', there is a non-skid layer 4 of a resilient rubber which covers the support surfaces of the support device.

The base body 1 and the support plate 2 are rectangular in shape. An upstanding web 5, 6 extends along two adjacent side edges of the support surface so as to provide side walls 5, 6 extending at a right angle with respect to each other. The side wall 6 extending along a transverse edge includes a recess 7 permitting passage for example of a power cord for a mobile telephone placed onto the support device.

At its bottom wall 8 opposite the support plate 2, the device includes some openings 9 by which the support device can be engaged for mounting onto a support device holder as shown in (Ser. No. 08/670,495) whereby hook-like clamps extend through the openings 9 for engagement with the support device. Alternatively, a two-sided self adhesive foil may be disposed on the bottom wall 8 for mounting the support device onto a support surface.

What is claimed is:

1. A support device for supporting a mobile telephone, comprising a support base including means for mounting said support device on a support structure and having a top for supporting said mobile telephone, said top having at least one recess formed therein a permanent magnet disposed in each recess, a non-skid layer disposed on said top so as to cover said top and said magnet or magnets in said at least one recess and forming a flat support surface for supporting said mobile telephone when placed thereon and holding it in engagement with said non-skid layer on said top, and a web extending along at least one side edge of said support plate so as to form a side wall delimiting said support surface.

2. A support device according to claim 1, wherein said non-skid layer consists of a resilient sponge rubber pad.

3. A support device according to claim 1, wherein said web extends along two adjacent side edges of said top so as to form an angled side wall.

4. A support device according to claim 3, wherein said web includes a recess for receiving a power cord extending to a mobile telephone placed onto said support device.

* * * * *